(12) United States Patent
Starz et al.

(10) Patent No.: US 7,754,369 B2
(45) Date of Patent: Jul. 13, 2010

(54) INK FOR PRODUCING MEMBRANE ELECTRODE ASSEMBLIES FOR FUEL CELLS

(75) Inventors: Karl-Anton Starz, Rodenbach (DE); Ralf Zuber, Grossostheim (DE); Anita Krämer, Neuberg (DE); Knut Fehl, Schlüchtern-Ramholz (DE); Joachim Köhler, Bruchköbel (DE); Sandra Wittpahl, Obertshausen (DE)

(73) Assignee: Umicore AG & Co. KG, Hanau-Wolfgang (DE)

( * ) Notice: Subject to any disclaimer, the term of this patent is extended or adjusted under 35 U.S.C. 154(b) by 242 days.

(21) Appl. No.: 09/915,764

(22) Filed: Jul. 27, 2001

(65) Prior Publication Data

US 2002/0034674 A1    Mar. 21, 2002

(30) Foreign Application Priority Data

Jul. 29, 2000    (DE) ................. 100 37 074

(51) Int. Cl.
*H01M 4/86* (2006.01)
(52) U.S. Cl. .................................... 429/40; 429/41
(58) Field of Classification Search ................. 502/101; 427/115; 204/296, 282; 429/33, 30, 40–43, 429/46, 12, 44, 45
See application file for complete search history.

(56) References Cited

U.S. PATENT DOCUMENTS

| | | | | |
|---|---|---|---|---|
| 4,185,131 | A * | 1/1980 | Goller et al. ................. 427/113 |
| 5,084,144 | A | 1/1992 | Reddy et al. |
| 5,211,984 | A | 5/1993 | Wilson |
| 5,330,860 | A * | 7/1994 | Grot et al. ..................... 429/42 |
| 5,723,173 | A | 3/1998 | Fukuoka et al. |
| 5,767,036 | A | 6/1998 | Freund et al. |
| 5,861,222 | A | 1/1999 | Fischer et al. ................. 429/42 |
| 5,869,416 | A | 2/1999 | Mussell ....................... 502/101 |
| 5,871,552 | A | 2/1999 | Tada ........................ 29/623.5 |
| 5,882,810 | A * | 3/1999 | Mussell et al. ................. 429/33 |
| 6,022,634 | A * | 2/2000 | Ramunni et al. ............... 429/34 |
| 6,074,692 | A | 6/2000 | Hulett |
| 6,309,772 | B1 | 10/2001 | Zuber et al. |
| 6,524,736 | B1 * | 2/2003 | Sompalli et al. ............... 429/42 |
| 7,186,665 | B2 | 3/2007 | De Heer et al. |
| 2001/0009733 | A1 * | 7/2001 | Campbell et al. .............. 429/44 |
| 2001/0024748 | A1 * | 9/2001 | Mizuno et al. ................. 429/44 |
| 2002/0034674 | A1 | 3/2002 | Starz et al. |
| 2002/0037449 | A1 * | 3/2002 | Binder et al. .................. 429/42 |

FOREIGN PATENT DOCUMENTS

| | | |
|---|---|---|
| DE | 0026979 | 4/1981 |
| DE | 0309337 | 3/1989 |
| DE | 196 02 629 A1 | 8/1996 |
| DE | 19611510 | 9/1997 |
| DE | 19611510 A1 | 9/1997 |
| DE | 19812592 | 10/1999 |
| DE | 19812592 A1 | 10/1999 |
| EP | 0026979 A2 | 4/1981 |
| EP | 0309337 A1 | 3/1989 |
| EP | 0622861 A | 11/1994 |
| EP | 0731520 | 9/1996 |
| EP | 0731520 A1 | 9/1996 |
| EP | 0743092 | 11/1996 |
| EP | 0 788 173 A1 | 8/1997 |
| EP | 0 987 777 A1 | 3/2000 |
| EP | 1176652 A | 1/2002 |
| WO | WO 92/15121 | 9/1992 |
| WO | WO 94/25993 | 11/1994 |
| WO | 01/71840 | 9/2001 |

OTHER PUBLICATIONS

European Search Report issued in connection with EP 01 11 5251 (EP Publication 1,176,652) dated Feb. 10, 2004.
Makoto Uchida, et al.; "New Preparation Method for Polymer-Electrolyte Fuel Cells," J. Electrochemical Soc. 142:2 Feb. 1995, pp. 463-468.
European Search Report for EP 05 00 3955 dated Apr. 1, 2005. (2 pages).

* cited by examiner

*Primary Examiner*—Patrick Ryan
*Assistant Examiner*—Monique Wills
(74) *Attorney, Agent, or Firm*—Kalow & Springut, LLP; John J. Santalone

(57) ABSTRACT

An ink is disclosed for producing membrane electrode assemblies for fuel cells which contains a catalyst material, an ionomer, water and an organic solvent. The ink is characterized in that the organic solvent is at least one compound from the group of linear dialcohols with a flash point higher than 100° C. and is present in the ink in a concentration between 1 and 50 wt. %, with respect to the weight of water.

14 Claims, 1 Drawing Sheet

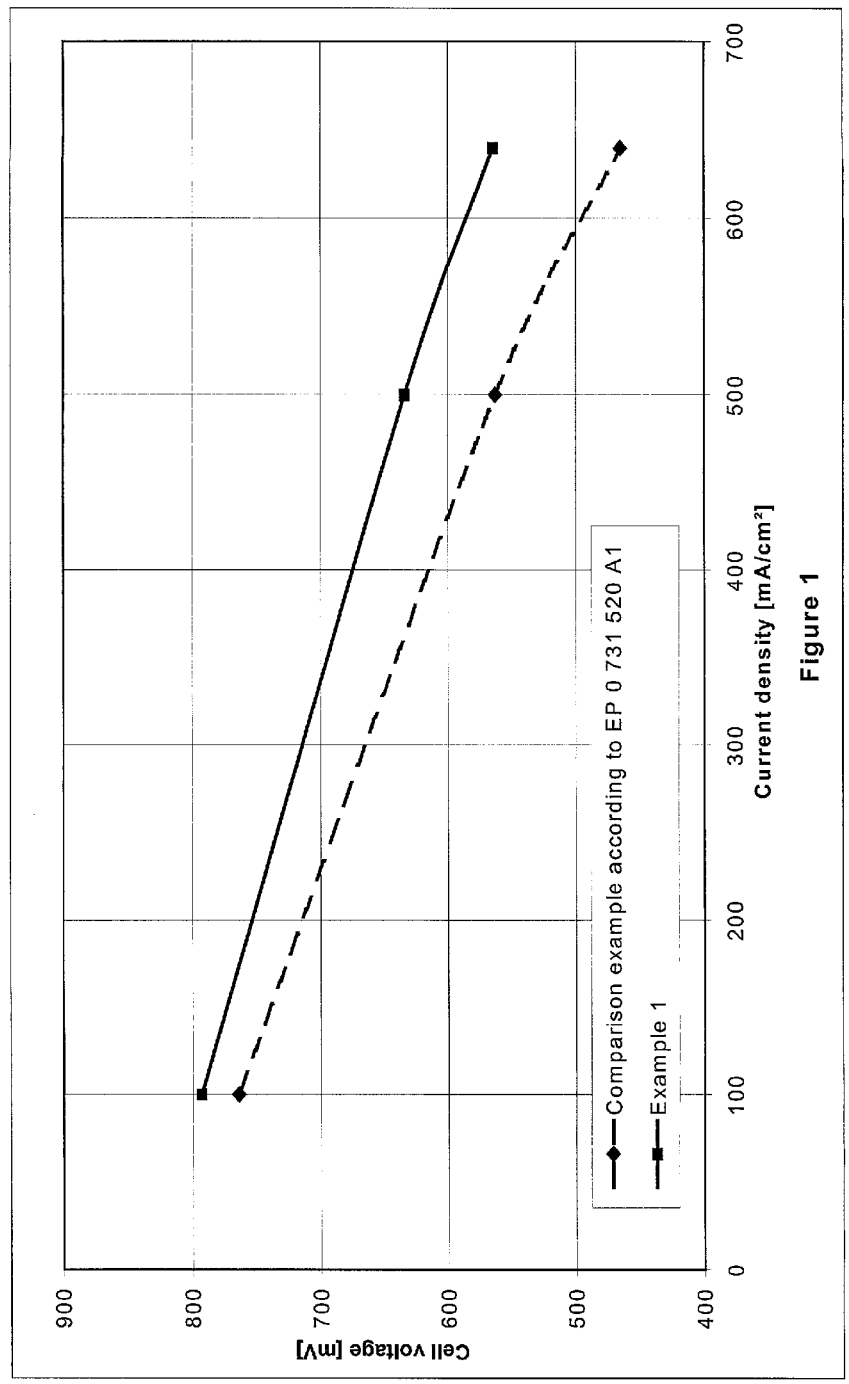

INK FOR PRODUCING MEMBRANE ELECTRODE ASSEMBLIES FOR FUEL CELLS

INTRODUCTION AND BACKGROUND

The present invention relates to an ink for producing membrane electrode assemblies for fuel cells, in particular for polymer electrolyte membrane fuel cells (PEM fuel cells) and direct methanol fuel cells (DMFC). More particularly, the present invention relates to a water-based catalyst ink for producing membranes coated with catalyst, electrodes and membrane electrode assemblies (MEAs).

Fuel cells convert a fuel and an oxidising agent which are spatially separated from each other at two electrodes into electricity, heat and water. Hydrogen or a hydrogen-rich gas may be used as the fuel and oxygen or air as the oxidizing agent. The process of energy conversion in the fuel cell is characterised by particularly high efficiency. For this reason, fuel cells in combination with electric motors are becoming more and more important as an alternative to traditional internal combustion engines. The PEM fuel cell is suitable for use as an energy converter in motor vehicles because of its compact structure, its power density and its high efficiency.

The PEM fuel cell consists of a stacked arrangement ("stack") of membrane electrode assemblies (MEAs), between which are arranged bipolar plates for supplying gas and removing electricity. A membrane electrode assembly consists of a solid polymer electrolyte membrane, both sides of which are provided with reaction layers containing catalyst. One of the reaction layers is designed as an anode for the oxidation of hydrogen and the second reaction layer is designed as a cathode for the reduction of oxygen. To these reaction layers are applied so-called gas distributor layers made of carbon paper or carbon fleece which facilitate good access by the reaction gases to the electrodes and effective removal of the cell current. The anode and cathode contain so-called electrocatalysts which catalytically support the particular reaction (oxidation of hydrogen at the anode or reduction of oxygen at the cathode). Metals from the platinum group in the periodic system of elements are preferably used as the catalytically active components. In the majority of cases, so-called supported catalysts, in which the catalytically active platinum group metal has been applied in highly dispersed form to the surface of a conductive support material, are used.

The polymer electrolyte membrane consists of proton-conducting polymer materials. These materials are also called ionomers for short in the following description. A tetrafluorethylene/fluorovinylether copolymer with acid functions, in particular sulfonic acid groups, is preferably used. Such materials are sold, for example, under the tradenames Nafion® (E.I. DuPont) or Flemion® (Asahi Glass Co.). However, other, and in particular, fluorine-free, ionomer materials such as sulfonated polyetherketones or arylketones or polybenzimidazoles may also be used. In addition, ceramic membranes and other high-temperature materials may also be used.

The performance data for a fuel cell depend critically on the quality of the catalyst layers applied to the polymer electrolyte membrane. These layers are mostly highly porous and usually consist of an ionomer and a finely divided electrocatalyst dispersed therein. Together with the polymer electrolyte membrane, so-called three-phase intersides are formed in these layers, wherein the ionomer is in direct contact with the electrocatalyst and the gases (hydrogen at the anode, air at the cathode) are introduced to the catalyst particles via the pore system.

To prepare the catalyst layers, ionomer, electrocatalyst, solvent and optionally other additives are carefully blended together to form an ink or a paste. To produce the catalyst layer, the ink is applied by brushing, rolling, spraying, doctor blading or printing either to the gas distributor structure (e.g. carbon fleece or carbon paper) or directly to the polymer membrane, dried and optionally aftertreated. In the case of coating the ionomer membrane with a catalyst layer, the non-catalyzed gas distributor structures are then mounted on the membrane on the anode and cathode sides and a membrane electrode assembly (MEA) is then obtained. If the gas distributor is coated with a catalyst layer, these catalyzed gas distributor structures are placed on the two sides of the ionomer membrane and then compression moulded with this, wherein a MEA is also obtained.

Various ink formulations are disclosed in the patent literature. Thus, in DE 196 11 510 A1, an ink is used to produce membrane electrode assemblies for fuel cells which contains, with respect to the total weight of ink, 3.1 wt. % of a Pt/C catalyst (30 wt. % platinum on carbon black), 30.9 wt. % of a 5% strength ionomer solution in a mixture of 90 parts isopropanol and 10 parts water, 37.2 wt. % glycerine, 24.8 wt. % water, 2.5 wt. % tetrabutylammonium hydroxide and 1.5 wt. % of a pore-former. The water content of the ink is 27.7 wt. % in total. As a result of the high concentration of isopropanol in this ink, appropriate measures have to be taken during production to prevent unwanted ignition of the catalyst. In addition, it has been shown that the ink can be processed only over a very short time by means of a screen printing process due to the low boiling point of isopropanol; the so-called "screen life" during which screen printing is possible is unsatisfactory. Furthermore, the glycerine present in the ink means that the membrane electrode assembly (MEA) requires a very long activation and conditioning period before acceptable electrical performance is obtained.

Furthermore, catalyst inks are know which use alcohols with a boiling point higher than 100° C. (U.S. Pat. No. 5,871,552) or alkylene carbonates such as, for example, propylene carbonate (U.S. Pat. No. 5,869,416) as solvent. Furthermore, DE 198 12 592 A1 describes an ink of two organic solvents A and B which are not miscible with each other. Monohydric or polyhydric alcohols, glycols, glycol either alcohols, glycol ethers and mixtures thereof are used as solvent A. Solvent B is a non-polar hydrocarbon or weakly polar solvent. A typical ink of this type (see example 1 in DE 198 12 592 A1) contains 13.4 wt. % of a Pt/C electrocatalyst, 67 wt. % of a 6.7% strength solution of an ionomer (Nafion) in propylene glycol (solvent A), 17.9 wt % methyl dodecanoate (solvent B) and 1.7 wt. % of sodium hydroxide solution (10% strength). These catalyst inks contain predominately organic solvents and only small amounts of water in the form of the sodium hydroxide solution. Due to the high proportion of solvent, they tend to ignite. The considerable emissions of organic compounds (solvents are "volatile organic compounds"=VOCs) is a problem with regard to occupational health and safety and the protection of the environment, in particular when mass producing components for fuel cells.

EP 0 026 979 A2 describes an ink based on water but which does not contain an ionomer, rather hydrophobized Teflon. This ink is therefore unsuitable for the electrodes and MEAs which are used in PEM fuel cells.

EP 0 731 520 A1 describes an ink which contains a catalyst, ionomer and solvent, wherein water is used as solvent. This ink does not contain any further organic components, apart from the ionomer. When the applicants checked this ink, it was shown that it led to electrode layers which adhered too poorly to the polymer membrane. As a result, the electrical performance of MEAs produced with this ink is inadequate. Likewise, when screen printing with this ink, it was shown that it thickened very rapidly and thus had inadequate screen lifes for screen printing.

Thus, it was an object of the present invention to provide a water-based catalyst ink which contains no toxic and/or readily inflammable solvents and which in addition overcomes the disadvantages of the water-based ink previously described in EP 0 731 520 A1 (poor adhesion, poor electrical performance, short screen life).

Another object of the invention is to attain high production safety in the area of occupational health and safety and protection of the environment and to have an ink particularly suitable for screen printing.

SUMMARY OF THE INVENTION

The above and other objects of the present invention can be achieved by an ink for producing electrodes for fuel cells in particular PEM fuel cells and direct methanol fuel cells, which contain a catalyst material, an ionomer, water and an organic solvent (co-solvent). The ink is characterized in that the organic solvent is at least one compound selected from the group of linear dialcohols with a flash point higher than 100° C. and is present in the ink in a concentration between 1 and 50 wt. %, with respect to the weight of water.

Linear dialcohols are understood to be dihydric alcohols which have two hydroxyl groups in their linear, chain-shaped, molecular structure. The hydroxyl groups must not be adjacent to each other (i.e. vicinal). The chain structure may consist of aliphatic $CH_2$ groups, optionally with oxygen atoms (ether bridges) in between these. Representative organic solvents for catalyst inks according to the invention are, for example:

| | |
|---|---|
| Ethylene glycol (1,2-ethanediol) | Flash point 111° C. |
| Diethylene glycol | Flash point 140° C. |
| 1,2-propylene glycol (1,2-propanediol) | Flash point 101° C. |
| 1,3-propylene glycol (1,3-propanediol) | Flash point 131° C. |
| Dipropylene glycol | Flash point 118° C. |
| 1,3-butanediol | Flash point 109° C. |
| 1,4-butanediol | Flash point 130° C. | and other compounds from this group. Determination of the flash point is performed in a closed cup using the Pensky-Martens method in accordance with European standard EN 22719. The data are taken from the database CHEMSAFE (Dechema e.V.) and represent "recommended values".

These solvents are generally soluble in or miscible with water and are hydrologically and toxicologically largely harmless. Thus, ethylene glycol, propylene glycols and butylene glycols do not have to be labelled as hazardous materials. Their use in industrial drying assemblies does not represent a problem.

It has been shown that an ink which contains substantially water as solvent has surprisingly good adhesion to the polymer membrane when it contains, as additional solvent, 1 to 50 wt. %, preferably 5 to 25 wt. %, (with respect to the water content of the ink) of a compound from the group of linear dialcohols with flash points higher than 100° C. In addition, these inks have a very good screen life with regard to screen printing and good electrical performance values in the PEM fuel cell. Obviously, linear dialcohols have the effect of bringing about intimate contact between the catalyst layer and the ionomer membrane and thus producing good adhesion and electrical performance.

Since, in the ink according to the invention, the main component is still water (proportion of solvent preferably 5-25 wt. % with respect to the water content) and the linear dialcohols have a flash point higher than 100° C., the known problems of ready inflammability and low ignition points associated with inks containing traditional solvents do not occur.

Thus, high production safety is achieved when processing these inks. In addition, a long screen life is enabled during use in screen printing processes and this clearly exceeds that of pure water-based pastes (according to EP 0 731 520 A1).

To prepare the paste, ink or preparation according to the invention, the components noble metal-containing supported catalyst (e.g. 40% Pt on carbon black)
ionomer solution in aqueous form (e.g. aqueous Nafion solution)
fully deionized water
additional, organic solvent (cosolvent)

are weighed into a suitable container and dispersed. Devices used as dispersing equipment are those which produce a high shear force (dissolver, roll mill, etc.).

The ink according to the invention is applied directly to a polymer electrolyte membrane. However, it may also be applied to the gas distributor structure (e.g. carbon paper or carbon fabric). Various coating processes such as spraying, screen printing, stencil printing or off-set printing can be used for this purpose. Suitable coating processes are described in U.S. Pat. No. 5,861,222.

The polymer electrolyte membrane consists of a proton-conducting film. Such a material is sold as a film, for example, by E.I. DuPont under the tradename Nafion®. In addition, the ionomer is also obtainable in aqueous solution with low molecular weight aliphatic alcohols (Fluka, Buchs; Aldrich, Steinheim). Aqueous solutions of the ionomer at higher concentrations (10%, 20%) can be prepared from these. In principle, however, any other, in particular fluorine-free, ionomer materials, such as sulfonated polyetherketones, arylketones or polybenzimidazoles, may also be used as a film or as a solution.

Any electrocatalysts known from the field of fuel cells may be used as catalysts. In the case of supported catalysts, a finely divided, electrically conductive carbon is used as the support. Carbon black, graphite or activated carbon are preferably used. The platinum group metals are used as catalytically active components, e.g. platinum, palladium, ruthenium, and rhodium or alloys thereof. The catalytically active metals may contain further alloying elements such as cobalt, chromium, tungsten, molybdenum, vanadium, iron, copper, nickel etc. Depending on the thickness of the electrode layer, concentrations per assembly area of metal in the catalyst layers between 0.01 and 5 mg noble metal/$cm^2$ are possible. To prepare catalyst layers, platinum electrocatalysts on carbon black (Pt/C) with 5 to 80 wt. % platinum, or else support-free catalysts such as, for example, platinum black or platinum powder with high surface areas may also be used. Suitable electrocatalysts are described in patent documents EP 0 743 092 and DE 44 43 701.

Apart from these components, the ink according to the invention may also contain additives such as wetting agents, flow control agents, defoaming agents, pore-formers, stabilisers, pH modifiers and other substances.

BRIEF DESCRIPTION OF DRAWING

The present invention will be further understood with references to the accompanying drawing shown in FIG. 1, which is a plot of cell voltage versus current density for the product of example 1 compared to the prior art.

DETAILED EMBODIMENTS OF THE INVENTION

To determine the electrical performance, the membrane electrode assembly prepared using the catalyst inks is tested in a PEM single cell test. The PEM cell is operated with hydrogen and air at atmospheric pressure (about 1 bar) and the characteristics (variation of voltage with current density) are determined. From these characteristics, the cell voltage obtained at a current density of 500 mA/cm$^2$ is determined as a measure of the electrocatalytic efficiency of the cell. For better comparability of the ink systems, the catalyst loading is kept constant (total loading about 0.2 to 0.6 mg Pt/cm$^2$).

The ink according to the invention can be processed effectively in different coating processes and has very good adhesion to all commonly used polymer electrolyte membranes (ionomer films such as, for example, Nafion® or Flemion®). The membrane electrode assemblies produced therewith exhibit high electrical performance in the PEM fuel cell. The electrical performance is typically well above that of a pure water-based paste.

The following examples are intended to explain the invention in more detail. FIG. 1 shows the variation of the cell voltage versus current density for the membrane electrode assemblies produced in comparison example 1 and example 1 using the ink according to the invention.

Comparison Example 1

Ink According to EP 0 731 520 A1

The following components were homogenized in a dispersing assembly:

| | |
|---|---|
| 15.0 g | Pt supported catalyst (40% Pt/C, dmc$^2$) |
| 50.0 g | Nafion ® solution (10% in water) |
| 35.0 g | water (fully deionized) |
| 100.0 g | |

The weight ratio of catalyst to Nafion® in this ink was 3:1. The ink was applied in a screen printing process to the anode and cathode sides of an ionomer membrane Nafion® 112 (DuPont) in the form of a square with an edge length of 7.1 cm (active cell area 50 cm$^2$) and then dried at 80° C. Adhesion of the catalyst layers to the ionomer membrane proved to be inadequate, in particular there was peeling of the electrode layers in some places after drying and then humidifying the ionomer membrane with water.

After drying and humidifying with water, the MEA was placed between two gas distributor substrates (TORAY carbon paper, thickness 225 μm) and measurements were made in a PEM single cell operating with hydrogen/air. At a current density of 500 mA/cm$^2$ a cell voltage of 560 mV was measured (see FIG. 1, type A). The total Pt loading (anode and cathode) was 0.6 mg Pt/cm$^2$.

Example 1

Differently from comparison example 1, the amount of water was reduced to 27 g and replaced by 8 g of dipropylene glycol in accordance with the invention:

| | |
|---|---|
| 15.0 g | Pt supported catalyst (40% Pt/C, dmc$^2$) |
| 50.0 g | Nafion ® solution (10% in water) |
| 27.0 g | water (fully deionized) |
| 8.0 g | dipropylene glycol |
| 100.0 g | |

The ratio by weight of catalyst to Nafion® was 3:1. The proportion of dipropylene glycol was 11 wt. % (with respect to the total water content). The ink was applied to the anode and cathode sides of the ionomer membrane Nafion® 112 as described in comparison example 1. Adhesion of the electrode layers to the membrane after drying and humidifying with water was very good, no peeling of the layers was observed. The total Pt loading was 0.6 mg Pt/cm$^2$. The MEA produced in this way was measured in the PEM single cell test. At a current density of 500 mA/cm$^2$ a cell voltage of 634 mV was measured. This value was about 70 mV above the cell voltage in comparison example 1 (see FIG. 1). Thus the ink according to the invention is clearly superior to the ink in accordance with comparison example 1.

Example 2

The following components were homogenized:

| | |
|---|---|
| 15.0 g | PtRu supported catalyst (40% PtRu/C: 26.4% Pt, 13.6% Ru; catalyst according to U.S. Pat. No. 6,007,934) |
| 60.0 g | Nafion ® solution (10% in water) |
| 15.0 g | water (fully deionized) |
| 10.0 g | ethylene glycol |
| 100.0 g | |

The ratio by weight of catalyst to Nafion® was 2.5:1. The proportion of ethylene glycol was 14.5 wt. % (with respect to the total water content). The ink was applied to the anode side of an ionomer membrane (Nafion® 112, DuPont) and then dried at 80° C. Then the ink according to the invention from example 1 was applied to the rear side of the membrane (cathode side) and again dried. After drying, the MEA was moistened with water and then placed moist between two gas distributor substrates. Adhesion of the catalyst layers to the membrane was very good. Measurements were performed in the PEM single cell operating with hydrogen/air. At 500 mA/cm$^2$ a cell voltage of 620 mV was measured. The MEA also had very good performance values when operating with reformate (gas composition 60 vol. % hydrogen, 25 vol. % carbon dioxide, 15 vol. % nitrogen, 40 ppm carbon monoxide); 600 mV at 500 mA/cm$^2$.

Example 3

Another ink was prepared, with the following composition:

| | |
|---|---|
| 15.0 g | Pt supported catalyst (40% Pt/C, dmc$^2$) |
| 50.0 g | Nafion ® solution (10% in water) |
| 20.0 g | water (fully deionized) |
| 15.0 g | diethylene glycol |
| 100.0 g | |

The ratio of catalyst to Nafion® was 3:1. The proportion of diethylene glycol was 23 wt. % (with respect to total water content). The ink was applied to the front and rear sides of an ionomer membrane (thickness 30 μm). Adhesion of the catalyst layers after drying and humidification with water was very good. The performance in a PEM single cell operating with hydrogen/air was 650 mV with a current density of 500 mA/cm$^2$.

Example 4

The ink according to example 2 was applied by screen printing to a gas distributor structure which had been provided with a carbon black levelling layer and then dried at 80° C. The loading on the anode gas distributor prepared in this way was 0.3 mg Pt/cm$^2$ and 0.15 mg Ru/cm$^2$. The active cell area was 50 cm$^2$. In a second step, the ink according to example 1 was applied to a gas distributor structure, again using screen printing, and dried. The cathode gas distributor prepared in this way had a loading of 0.4 mg Pt/cm$^2$. To produce a membrane electrode assembly, a dry ionomer membrane (Nafion 112, DuPont) was introduced in between the anode and cathode gas distributors and laminated at 135° C. with a pressure of 7 kN. The structure produced in this way was mounted in a PEM fuel cell and measured when operating with reformate/air (gas composition; see example 2). The cell voltage was 630 mV with a current density of 500 mA/cm$^2$.

Further variations and modifications of the foregoing will be apparently to those skilled in the art and are intended to be encompassed by the claims appended hereto.

German priority application 100 37 074.8 is relied on and incorporated herein by reference.

We claim:

1. A water-based ink for producing a membrane electrode assembly for a fuel cell comprising:
    an electrocatalyst,
    an aqueous solution of an ionomer comprising predominantly water as the solvent, and
    a solvent which is substantially water with a smaller amount of an organic solvent as a co-solvent,
    wherein said organic solvent is at least one linear dialcohol with a flash point higher than 100° C. and being present in the ink in a concentration between 5 and 25 wt. %, with respect to the water content of the ink.

2. The ink according to claim 1 wherein said linear alcohol is a dihydric alcohol wherein hydroxyl groups are not adjacent to each other.

3. The ink according to claim 2 wherein said alcohol has a chain structure consisting of aliphatic $CH_2$ groups, optionally with oxygen atoms between said $CH_2$ groups.

4. The ink according to claim 1, wherein said dialcohol is a member selected from the group consisting of ethylene glycol, diethylene glycol, propylene glycol, dipropylene glycol, butanediol and mixtures thereof.

5. The ink according to claim 1, wherein said dialcohol is 1,2-propylene glycol or 1,3-propylene glycol.

6. The ink according to claim 1, wherein said electrocatalyst is a noble metal-containing supported catalyst.

7. The ink according to claim 1, wherein said electrocatalyst is a support-free catalyst.

8. The ink according to claim 7, wherein said electrocatalyst is platinum black or platinum powder with high surface area.

9. The ink according to claim 1, wherein the aqueous solution of the ionomer has an ionomer concentration of 10% in water.

10. A polymer electrolyte membrane coated with the ink of claim 1.

11. A membrane electrode assembly with the ink of claim 1.

12. A gas distributor substrate coated with the ink of claim 1.

13. The ink according to claim 1, wherein the aqueous solution of the ionomer has an ionomer concentration of 20% in water.

14. A process for improving adhesion of catalyst layers to membranes during production of membrane electrode assemblies for fuel cells, the process comprising use of a water-based ink comprising:
    an electrocatalyst,
    an aqueous solution of an ionomer comprising predominantly water as the solvent, and
    a solvent which is substantially water with a smaller amount of an organic solvent as a co-solvent,
    wherein said organic solvent is at least one linear dialcohol with a flash point higher than 100° C. and being present in the ink in a concentration between 5 and 25 wt. %, with respect to the water content of the ink.

* * * * *